United States Patent [19]

Tambornino

[11] Patent Number: 5,664,304
[45] Date of Patent: Sep. 9, 1997

[54] S-HOOK WITH SAFETY LATCH

[76] Inventor: Curt Tambornino, 6200 Hwy. 12, Eau Claire, Wis. 54703

[21] Appl. No.: 711,438

[22] Filed: Sep. 6, 1996

[51] Int. Cl.⁶ .................. A44B 13/02; B66C 1/36
[52] U.S. Cl. .................. 24/599.1; 294/82.19; 24/370
[58] Field of Search .................. 24/599.1, 598.7, 24/598.4, 599.3, 598.1, 265 H, 192, 369, 370; 294/82.1, 82.17, 82.19, 82.2

[56] References Cited

U.S. PATENT DOCUMENTS

| 874,647 | 12/1907 | Wlatnigg | 24/599.1 |
|---|---|---|---|
| 1,709,235 | 4/1929 | Shaffer | 294/82.19 |
| 4,044,316 | 8/1977 | Wagner | 24/599.1 X |
| 4,095,316 | 6/1978 | Gabriel | 24/599.1 X |
| 5,005,266 | 4/1991 | Fister et al. | 294/82.2 X |
| 5,538,303 | 7/1996 | Dunham | 24/599.1 X |

FOREIGN PATENT DOCUMENTS

| 142261 | 6/1935 | Germany | 294/82.19 |

*Primary Examiner*—Peter M. Cuomo
*Assistant Examiner*—Robert J. Sandy
*Attorney, Agent, or Firm*—Kinney & Lange, P.A.

[57] ABSTRACT

A safety latched hook has a hook link, a latch and a spring biasing the latch to a closed position. The hook link has a bend in a closed side opposite a latch end. The a chain attachment opening, defined as the distance from the latch end to the closed side, is at least as wide as the thickness of the material for the hook link. The hook can receive a chain of the same thickness material within the chain turn of the hook link, and does not require any further attachment mechanism to attach to a chain.

8 Claims, 4 Drawing Sheets

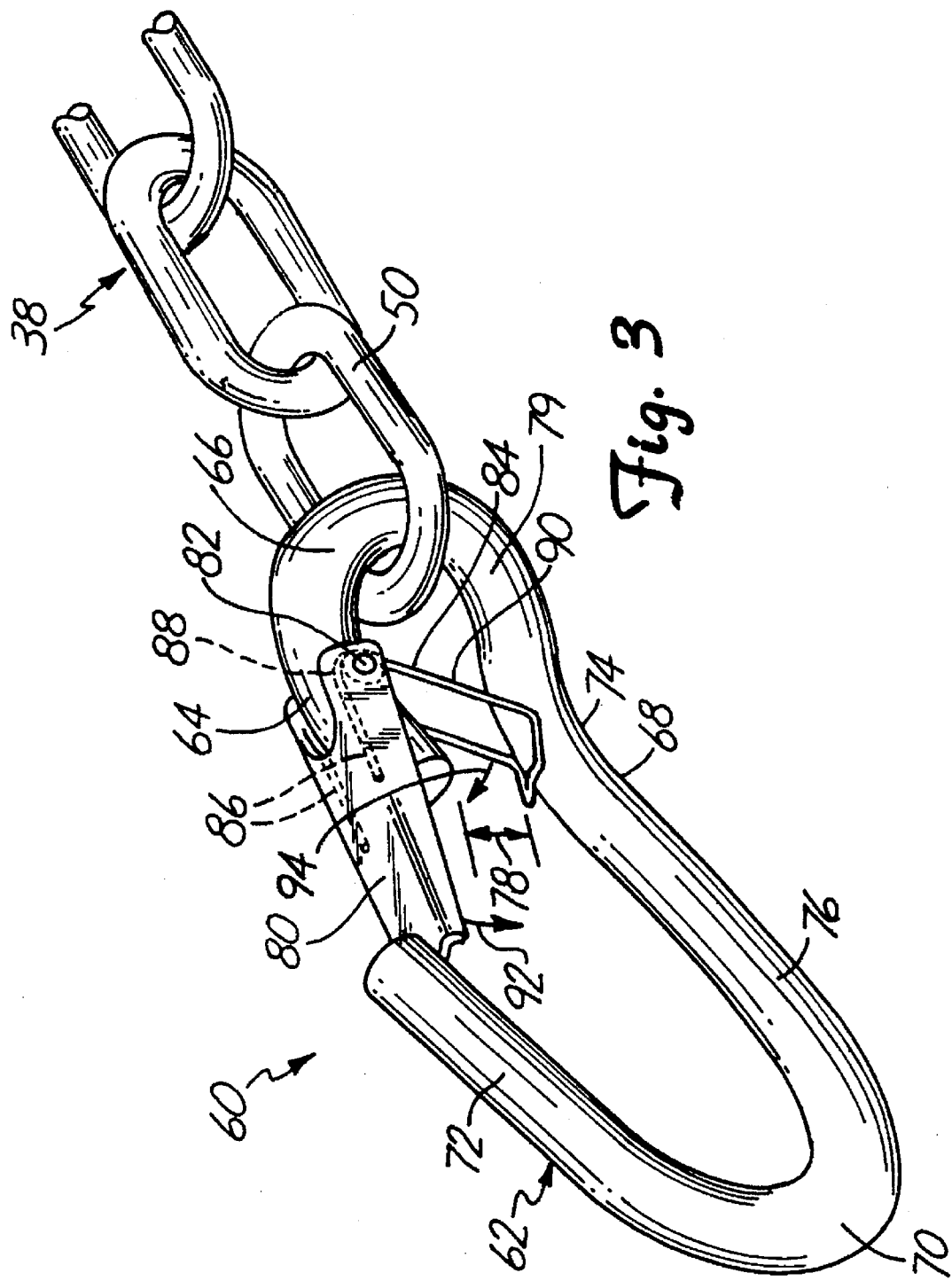

S-HOOK WITH SAFETY LATCH

BACKGROUND OF THE INVENTION

The present invention relates to hooks, and, more particularly, to hooks which are used to attach a chain to another object and have a safety latch over the hook opening which receives the chain.

Hooks have been used for years to attach chains to other objects. One particularly type of hook, sometimes referred to as an "Shook", has a primary member or "hook link" which is shaped similar to a large link of a chain but has an opening on one side. A safety latch may be used across the opening, to close the side until pressure is applied to the safety latch in the proper direction to open the S-hook. Opposite the latched side of the hook link is the closed side. Some safety latched S-hooks include a bend in the closed side. The bend places one loop of the hook link, the "chain turn", at an orientation which is angularly offset from the orientation of the opposite loop or "hook turn" of the hook link. This bend in the closed side facilitates attaching a chain to many types of objects, as the chain tends to be directed off the object at an angle compared to the hooking of the hook link to the object.

However, such safety latched hooks with bends in the closed side have not been manufactured to easily accept a chain through the latched opening. Often, a lap link or other type of relatively expensive connection apparatus is required to properly attach the chain to the hook link. Accordingly, a new design of a safety latch hook is needed which will avoid these problems and provide a safety latch hook which can easily attach to a chain without requiring a further attachment device.

SUMMARY OF THE INVENTION

The present invention is a safety latched hook which can be used to attach a chain to another object without using a further attachment device such as a lap link. The safety latch hook includes a hook link with a bend in the closed side. The distance from the bend to the latch end of the hook link for the chain opening is at least as great as the thickness of the material of the hook link, such that the hook link can receive a chain of the same thickness material within the chain turn of the hook link.

BRIEF DESCRIPTION OF THE DRAWINGS

FIG. 3 is a perspective view of the safety latch hook of the present invention attached to a chain.

While the above-identified drawing figures set forth a preferred embodiment, other embodiments of the present invention are also contemplated, some of which are noted in the discussion. In all cases, this disclosure presents the illustrated embodiment of the present invention by way of representation and not limitation. Numerous other minor modifications and embodiments can be devised by those skilled in the art which fall within the scope and spirit of the principles of this invention.

DETAILED DESCRIPTION OF THE PREFERRED EMBODIMENTS

Figure 1:
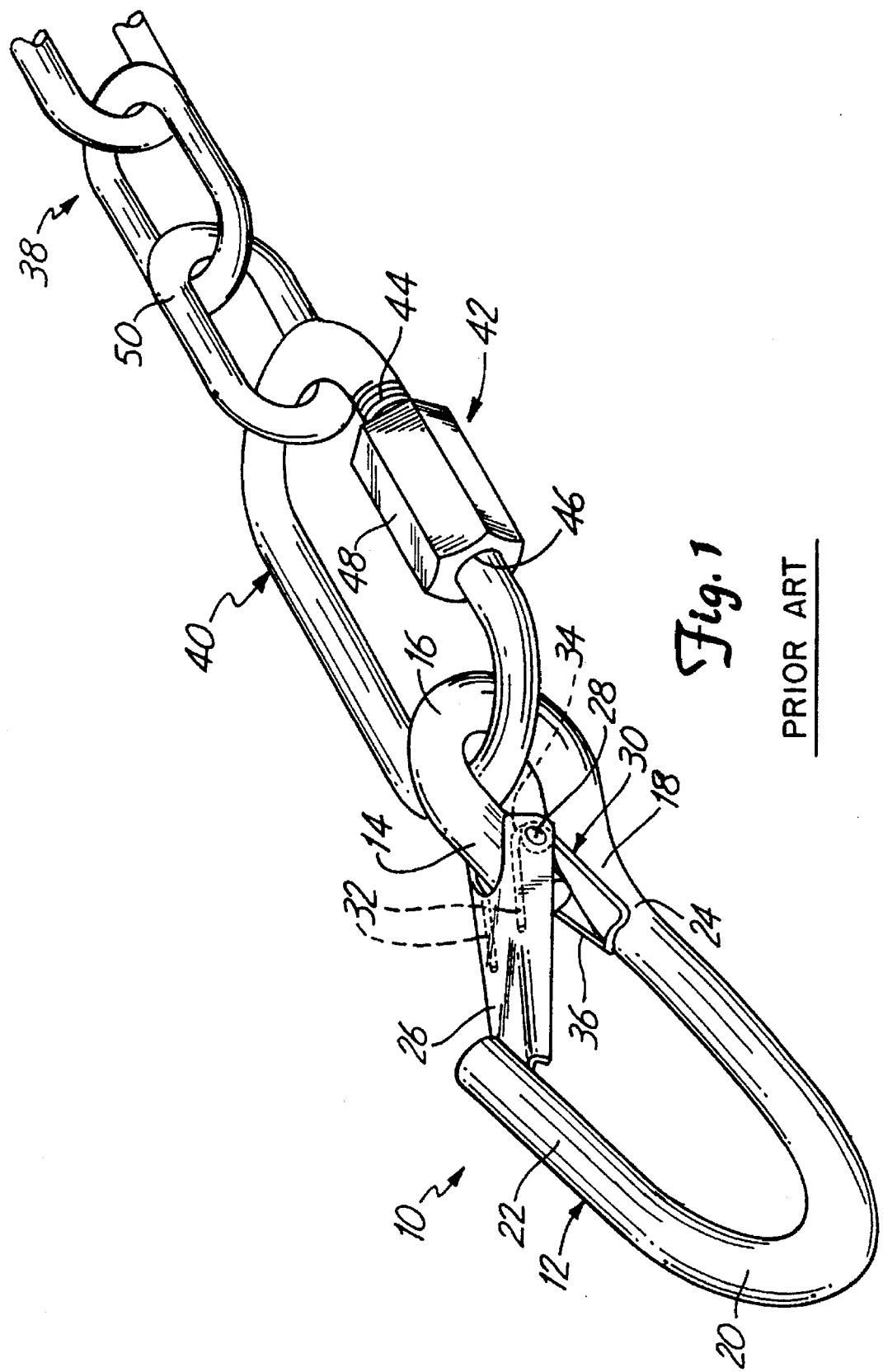
FIG. 1 is a perspective view of a prior art safety latch hook attached to a chain with a lap link.
Figure 2:
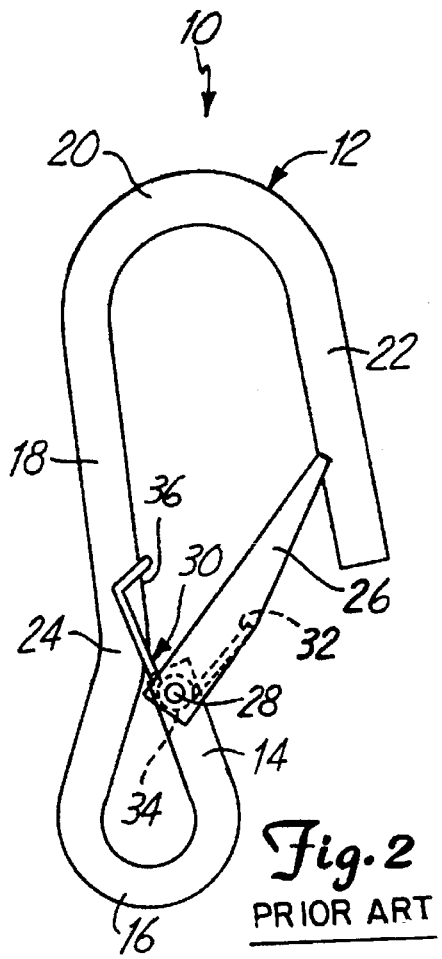
FIG. 2 is a side view of the prior art safety latch hook of FIG. 1.

FIGS. 1 and 2 show a prior art safety latched hook 10. The hook 10 includes a hook link 12, a safety latch 26 and a spring 30. Hook link 12 has a latch end 14, a chain turn 16, a closed side 18, a hook turn 20, and a hook side 22. A bend 24 is placed in the closed side 18. The chain turn 16 continues around for about 210°, far enough so that the latch end 14 is in contact with or is immediately adjacent the bend 24 in the closed side 18.

The safety latch 26 is pivotally connected to the latch end 14 by a pivot pin 28 such as a rivet. The spring 30 biases the safety latch 26 against the hook side 22. The spring 30 includes two legs 32 which extend within safety latch 26, a turn 34 around the pivot pin 28 for each of the legs 32, and an extended arm 36 which is biased against closed side 18.

To attach a chain 38 to the chain turn 16 of the hook 10, a lap link 40 must be used. The lap link 40 has an open side 42 with a threaded end 44 and an opposing threaded end 46. A nut 48 has internal threads and is mounted by its internal threads onto threaded end 44. The nut 48 can be screwed in one direction to extend the nut 48 and attach the nut 48 onto the opposing threaded end 46. If the nut 48 is screwed in the opposite direction, the nut 48 retracts onto the threaded end 44 and leaves an open side of the lap link 40. With the nut 48 in the open position, the threaded end 46 of the lap link can be inserted into a link 50 of chain 38 and into the chain turn 16 of the hook 10. The nut 48 is then closed on the threaded end 46 to attach the chain 38 to the hook 10.

Figure 4:
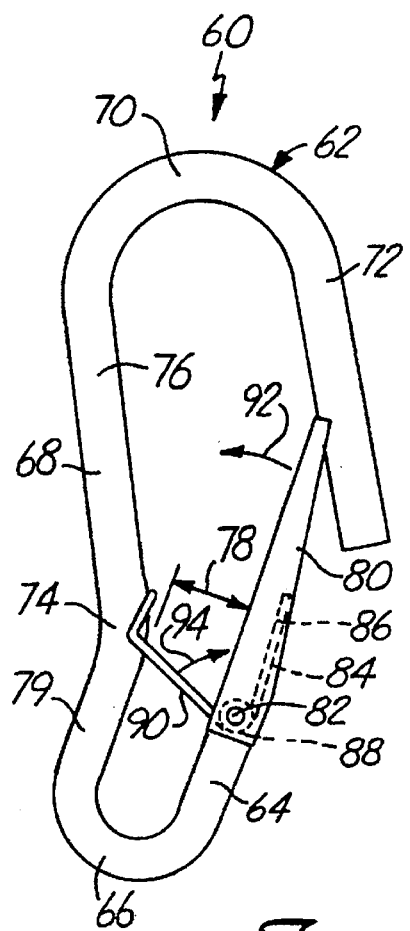
FIG. 4 is side view of the safety latch hook of FIG. 3.

FIGS. 3 and 4 show a safety latched hook 60 according to the present invention. The hook 60 includes a hook link 62, a safety latch 80 and a spring 84. The hook link 62 has a latch end 64, a chain turn 66, a closed side 68, a hook turn 70, and a hook side 72. The chain turn 66 provides a curved portion of the hook link 62 for supporting a link 50 of a chain 38. The hook turn 70 provides a curved portion of the hook link 62 for attachment to an object, ball hitch, link or other exterior member. The hook turn 70 preferable has a larger radius than the chain turn 66 and thus can be attached to larger objects.

A bend 74 is placed in the closed side 68. The bend 74 causes the chain turn 66 to be oriented at an angle compared to the hook turn 70. The hook side 72, hook turn 70 and closed side 68 are similar to the hook side 22, hook turn 20 and closed side 18 of the hook 10 of FIGS. 1 and 2. The hook turn 70 continues around for about 180°, so that the hook side 72 is generally parallel to the generally straight upper portion 76 of closed side 68.

Contrary to the prior art chain turn 16, the chain turn 66 of the present invention continues around for about 170° to 180°. This places the latch end 64 a significant distance 78 away from the closed side 68. This chain opening distance 78 provides an opening when attaching a chain 38 to the hook turn 70 of the hook 60. This also places the generally straight lower portion 79 of closed side 68 generally parallel to latch end 64.

The safety latch 80 is pivotally connected to the latch end 64 by a pivot pin 82. The pivot pin 82 is preferably a rivet which is attached into a hole drilled in the latch end 64 of the hook link 62. The spring 84 biases the safety latch 80 against the hook side 72. The spring 84 includes two legs 86 which extend within the safety latch 80, a turn 88 around the pivot pin 82 for each of the legs 86, and an extended arm 90 which is biased against the closed side 68. The extended arm 90 preferably extends across the chain opening distance 78 to the bend 74.

Contrary to the prior art hook 10, no further attachment means is necessary to attach the chain 38 to the hook 60 of the present invention. First, the chain 38 is attached to the hook 60 as if hook 60 were being attached to a separate object. The latch 80 is pivoted in the direction of arrow 92 to an open position, and the hook side 72 is inserted into the link 50. The latch 80 is then released to its closed position shown in FIGS. 3 and 4. Next, the extended arm 90 of the spring 84 is pivoted about pivot pin 82 in the direction of arrow 94. This opens chain opening distance 78, and the link 50 can be slid down the closed side 68 to the chain turn 66. When the extended arm 90 of the spring 84 is released to again extend across chain opening distance 78, it serves to hold a the link 50 of the chain 38 in place in the chain turn 66. Having the extending arm 90 contact the closed side 68 at the bend 74 allows extending arm 90 to define a natural break between the hook side and the chain side of the hook link 62, and keeps the extended arm 90 from getting in the way with either the hooking function or the chain attachment function of the hook 60.

In the preferred embodiment, the hook link 62 is preferably formed of a unitary piece of material having a generally uniform, circular cross-section of ⅜", 5/16" or ¼" diameter. The unitary piece of material is preferably die formed into the shape shown. Regardless of the diameter or cross-sectional shape of the hook link 62, the chain opening distance 78 should be as large or larger than the thickness of the material for hook link 62. This allows hook 60 to receive a link 50 of chain 38 of similar size and thickness to the material for hook link 62. The hook link 62, the latch 80, the spring 84 and the pivot pin 82 are all preferably formed of zinc plated steel. Hook link 62 and latch 80 may for instance be formed of cold rolled A36 steel which has been heat treated for strengthening.

The present invention provides several advantages over the prior art. First and most importantly, a chain 38 can be attached to the present hook 60 without any further attachment means. The spring 84 not only serves to bias the latch 80 into a closed position, but also serves to retain the chain 38 in the chain turn 66. The latch 80 also serves double duty of retaining the link 50 of the chain 38 in place as well as being a safety latch for object received in the hook turn 70.

Figure 5:
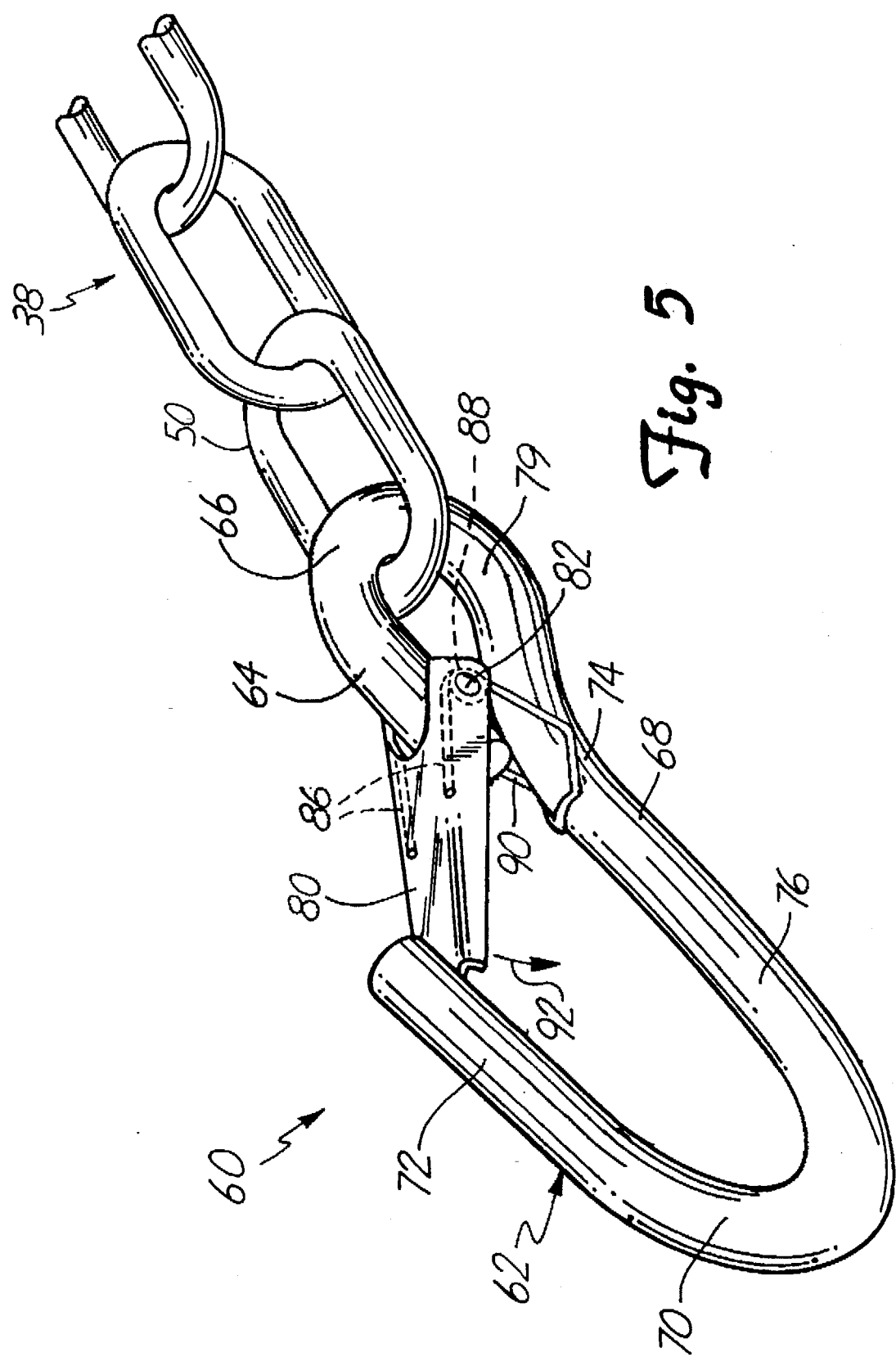
FIG. 5 is a perspective view of the safety latch hook of the present invention which has been closed around a chain link.

Additionally, after attachment of the chain 38 as described, the chain turn 66 of the present invention can be further bent around the link 50 to permanently attach the chain 38 to the hook 60. This is shown in FIG. 5, wherein the chain opening distance has been closed after insertion of the link 50 through the chain opening distance 78.

Although the present invention has been described with reference to preferred embodiments, workers skilled in the art will recognize that changes may be made in form and detail without departing from the spirit and scope of the invention.

What is claimed is:

1. A safety latch hook for attachment to a link of a chain, comprising:

a hook link unitarily formed of material having a thickness which is generally uniform, the hook link comprising:

a latch end;

a chain turn extending from the latch end and turning from the latch end to provide a curved portion of the hook link for supporting a link of a chain;

a closed side extending frown the chain turn, the closed side including a bend opposite the latch end and defining a chain opening distance between the bend and the latch end, wherein the chain opening distance is greater than the thickness of the material of the hook link;

a hook turn extending from the closed side and turning from the closed side to provide a curved portion of the hook link for attachment to an exterior member; and a hook side extending from the hook turn generally toward the latch end;

a latch pivotally connected to the latch end of the hook link by a pivot pin, the latch having a closed position and an open position, the latch in the closed position extending from the latch end of the hook link to the hook side of the hook link, the latch in the open position extending from the latch end of the hook link toward the closed side of the hook link; and a spring biasing the latch toward the closed position, wherein the spring extends from the latch end to a bias point at the bend in the closed side, such that the spring must be further biased against the latch in order to pass the link of the chain from the hook turn to the chain turn.

2. The safety latch hook of claim 1, wherein the hook turn has a larger radius than the chain turn.

3. The safety latch hook of claim 1, wherein the hook link is formed of zinc plated steel.

4. A safety latch hook for attachment to a link of a chain, comprising:

a hook link unitarily formed of material having a thickness which is generally uniform, the hook link comprising:

a latch end;

a chain turn extending from the latch end and turning from the latch end to provide a curved portion of the hook link for supporting a link of a chain;

a closed side extending from the chain turn, the closed side including a bend opposite the latch end and defining a chain opening distance between the bend and the latch end, wherein the chain opening distance is greater than the thickness of the material of the hook link, the closed side having a first generally straight portion extending from the chain turn to the bend and a second generally straight portion extending from the bend to the hook turn, wherein the first portion is generally parallel to the latch end;

a hook turn extending from the closed side and turning from the closed side to provide a curved portion of the hook link for attachment to an exterior member, the hook turn having a larger radius than the chain turn; and a hook side extending from the hook turn generally toward the latch end, the hook side being generally parallel to the second portion of the closed side;

a latch pivotally connected to the latch end of the hook link by a pivot pin, the latch having a closed position and an open position, the latch in the closed position extending from the latch end of the hook link to the hook side of the hook link; and, the latch in the open position extending from the latch end of the hook link toward the closed side of the hook link; and a spring biasing the latch toward the closed position, the spring extending from the latch end to a bias point at the bend in the closed side, such that the spring must be further biased against the latch in order to pass the link of the chain from the hook turn to the chain turn.

5. The safety latch hook of claim 6, wherein the hook link is formed of zinc plated steel.

6. A safety latch hook for attachment to a link of a chain, comprising:

a hook link unitarily formed of material having a thickness which is generally uniform, the hook link comprising:

a latch end;

a chain turn extending from the latch end and turning from the latch end to provide a curved portion of the hook link for supporting a link of a chain;

a closed side extending from the chain turn, the closed side including a bend opposite the latch end and defining a chain opening distance between the bend and the latch end, wherein the chain opening distance is greater than the thickness of the material of the hook link;

a hook turn extending from the closed side and turning from the closed side to provide a curved portion of the hook link for attachment to an exterior member; and a hook side extending from the hook turn generally toward the latch end, wherein the closed side has a first generally straight portion extending from the chain turn to the bend and a second generally straight portion extending from the bend to the hook turn, wherein the first portion is generally parallel to the latch end, and wherein the second portion is generally parallel to the hook side;

a latch pivotally connected to the latch end of the hook link by a pivot pin, the latch having a closed position and an open position, the latch in the closed position extending from the latch end of the hook link to the hook side of the hook link, the latch in the open position extending from the latch end of the hook link toward the closed side of the hook link; and a spring biasing the latch toward the closed position.

7. The safety latch hook of claim 6, wherein the hook turn has a larger radius than the chain turn.

8. The safety latch hook of claim 6, wherein the hook link is formed of zinc plated steel.

* * * * *

UNITED STATES PATENT AND TRADEMARK OFFICE
CERTIFICATE OF CORRECTION

PATENT NO. : 5,664,304
DATED : SEPTEMBER 9, 1997
INVENTOR(S) :
CURT TAMBORNINO

It is certified that error appears in the above-indentified patent and that said Letters Patent is hereby corrected as shown below:

On the Title Page "References Cited" U.S. PATENT DOCUMENTS delete "4,044,316", insert --4,044,429--

Col. 3, line 58, delete "frown", insert --from--

Signed and Sealed this

Thirty-first Day of March, 1998

Attest:

BRUCE LEHMAN

Attesting Officer

Commissioner of Patents and Trademarks